United States Patent [19]

Mangus et al.

[11] 4,405,558
[45] Sep. 20, 1983

[54] NUCLEAR REACTOR SHUTDOWN SYSTEM

[75] Inventors: James D. Mangus, Hempfield Township, Westmoreland County; Martin H. Cooper, Churchill, both of Pa.

[73] Assignee: Westinghouse Electric Corp., Pittsburgh, Pa.

[21] Appl. No.: 197,380

[22] Filed: Oct. 15, 1980

[51] Int. Cl.³ .............................................. G21C 7/08
[52] U.S. Cl. .................................... 376/233; 376/243; 376/336
[58] Field of Search ............ 176/DIG. 5, 86 R, 36 R, 176/22; 73/349, 362 AR, 347; 338/22, 24, 25, 27; 376/228, 243, 233, 336, 337

[56] References Cited

U.S. PATENT DOCUMENTS

| 2,931,763 | 4/1960 | Dever . | |
|---|---|---|---|
| 3,115,453 | 12/1963 | Paget . | |
| 3,147,188 | 9/1964 | Campbell | 376/337 |
| 3,170,842 | 2/1965 | Kehler . | |
| 3,194,740 | 7/1965 | Frisch | 176/86 R |
| 3,483,082 | 12/1969 | Dosh et al. . | |
| 3,784,788 | 1/1974 | Fourny | 338/22 R |
| 3,940,309 | 2/1976 | Imperiali . | |
| 3,976,540 | 8/1976 | Sowa . | |
| 4,073,681 | 2/1978 | Glazar et al. | 176/36 R |
| 4,104,507 | 8/1978 | Tisone et al. | 338/22 R |
| 4,139,414 | 2/1979 | Giuggio et al. | 376/337 |
| 4,304,632 | 12/1981 | Bhate et al. | 376/336 |

FOREIGN PATENT DOCUMENTS

1210500 2/1966 Fed. Rep. of Germany ...... 376/228

OTHER PUBLICATIONS

Apex-492, 5/59, pp. 7, 16, 21, 71-74.

Primary Examiner—Harvey E. Behrend
Attorney, Agent, or Firm—L. A. DePaul; Z. L. Dermer

[57] ABSTRACT

The nuclear reactor shutdown system comprises a temperature sensitive device connected to a magnetic latch of a neutron absorbing mechanism. The temperature sensitive device is disposed in the neutron absorbing mechanism in such a manner that it is exposed to the reactor coolant so that when the reactor coolant temperature rises above a specific level, the temperature sensitive device will cause the magnetic latch to open and allow neutron absorbing material to enter the reactor core. The temperature sensitive device comprises temperature sensitive material which may be a temperature sensitive resistor sometimes referred to as a thermistor. The thermistor is a device wherein its resistivity significantly increases with increase in its temperature such that when its temperature has significantly increased, the current passing through this system substantially decreases. Therefore, when the nuclear reactor coolant temperature rises significantly, the resistivity in the temperature sensitive material significantly increases to the point where little electricity flows through the circuit thereby causing the magnetic field in the magnetic latch to fall to a level at which the magnetic latch opens thereby inserting neutron absorbing material in the reactor core.

1 Claim, 4 Drawing Figures

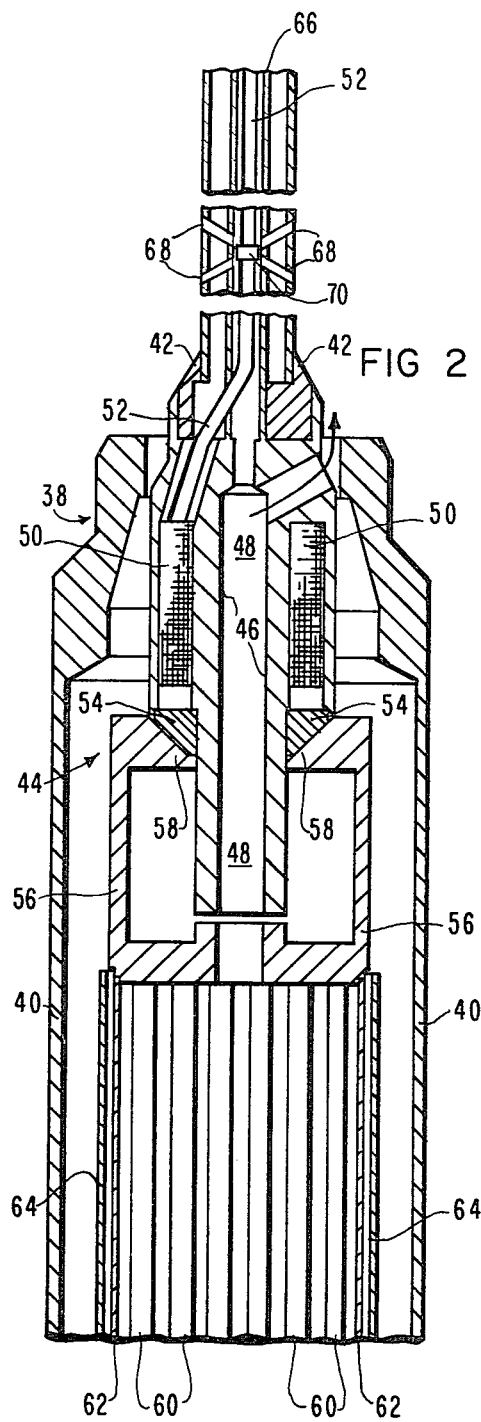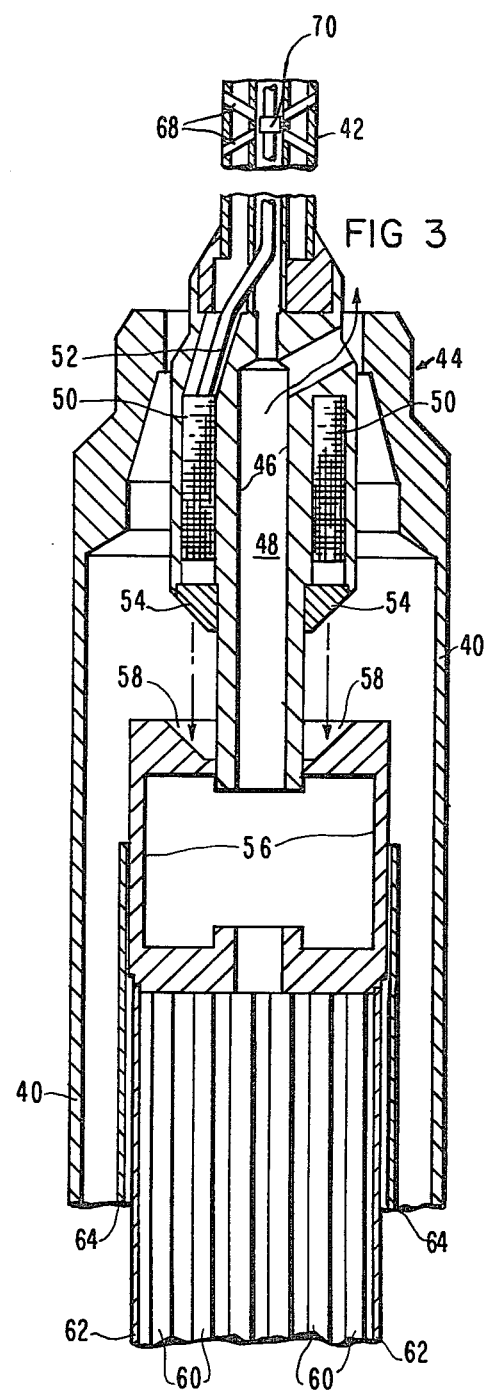

NUCLEAR REACTOR SHUTDOWN SYSTEM

BACKGROUND OF THE INVENTION

This invention relates to automatic control systems for nuclear reactors and more particularly to inherent shutdown systems for nuclear reactor control rods.

All nuclear reactors incorporate an emergency shutdown system which comprises a device for reducing the reactivity of the nuclear reactor core. The reduction in reactivity of the nuclear reactor core is generally accomplished by way of introducing a form of neutron absorbing material into the nuclear reactor core. The systems are intended to be simple and reliable systems for quickly introducing neutron absorbing material into the core of the nuclear reactor for effecting a shutdown of the reactor. The basic method known in the prior art for controlling a nuclear reactor is the system comprising control rods. In this system, the control rods are raised and lowered by mechanical mechanisms into and out of the nuclear reactor core for controlling the amount of reactivity in the core. In an emergency situation, the control rods are released such that they fall into the reactor core area thus reducing the reactivity of the core and shutting down the reactor. While this system has proven to be extremely reliable, additional back-up systems have been proposed as a redundant emergency reactor shutdown system. In many of the additional back-up systems proposed, the system is designed such that it will be a self-actuating or an inherent system.

As an alternative method of reactor control, the use of neutron absorbing balls has been suggested. In one such control system, the apparatus comprises a restraint mechanism for releasably restraining a multitude of discrete bodies of materials which are magnetic and possess neutron absorbing properties. The restraint means comprises at least one pair of magnetic pole pieces of opposite polarity, the apparatus being operated to release the discrete bodies by demagnetization of the pole pieces whereby the bodies are moved under the influence of gravity into the core of the reactor. In this system, should the magnetization of the pole pieces be lost for whatever reason, the neutron absorbing balls are dropped into the reactor core thereby reducing the reactivity of the nuclear reactor core.

Still another alternate method of reactor control comprises the use of a Curie point material which when heated to the Curie point loses substantially all of its magnetic susceptibility thereby causing an activation of the control system. In one such system, the neutron absorber material is restrained and supported by a magnet whose lines of force are linked by a yoke. The yoke is of a ferromagnetic material having a Curie point at the critical level and in contact with the reactor coolant. When the reactor coolant temperatures reaches the critical level, the yoke will be at its Curie point and thereby will lose its magnetic susceptibility releasing the neutron absorbing material into the core of the nuclear reactor. When cooled, the yoke regains its magnetic susceptibility thereby allowing the magnetic latch to be reused. One difficulty with the Curie point type systems is that the Curie material requires a relatively long time to heat to the Curie point due to the mass of the components. The slowness of response time of the Curie material may result in the inability of the reactor shutdown system to respond quickly.

Therefore, what is needed is a nuclear reactor shutdown system that is capable of quickly shutting down the nuclear reactor when the reactor coolant rises above a specific temperature.

SUMMARY OF THE INVENTION

The nuclear reactor shutdown system comprises a temperature sensitive device connected to a magnetic latch of a neutron absorbing mechanism. The temperature sensitive device is disposed in the neutron absorbing mechanism in such a manner that it is exposed to the reactor coolant so that when the reactor coolant temperature rises above a specific level, the temperature sensitive device will cause the magnetic latch to open and allow neutron absorbing material to enter the reactor core. The temperature sensitive device comprises temperature sensitive material which may be a temperature sensitive resistor sometimes referred to as a thermistor. The thermistor is a device wherein its resistivity significantly increases with increase in its temperature such that when its temperature has significantly increased, the current passing through this system substantially decreases. Therefore, when the nuclear reactor coolant temperature rises significantly, the resistivity in the temperature sensitive material significantly increases to the point where little electricity flows through the circuit thereby causing the magnetic field in the magnetic latch to fall to a level at which the magnetic latch opens thereby inserting neutron absorbing material in the reactor core.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

FIG. 2 is a cross-sectional view in elevation of a magnetic latch of a control rod drive mechanism in the latched position;

FIG. 3 is a cross-sectional view in elevation of the magnetic latch of a control rod drive mechanism in the open position.

DESCRIPTION OF THE PREFERRED EMBODIMENT

While the present control rod systems have proven to be extremely reliable in the control of nuclear reactors, additional redundant and inherent control systems are being proposed for use in conjunction with these and other control systems for nuclear reactors. The invention described herein provides a means by which a nuclear reactor can be automatically, inherently, and safely controlled in response to changes in the temperature of the reactor coolant.

Figure 1:
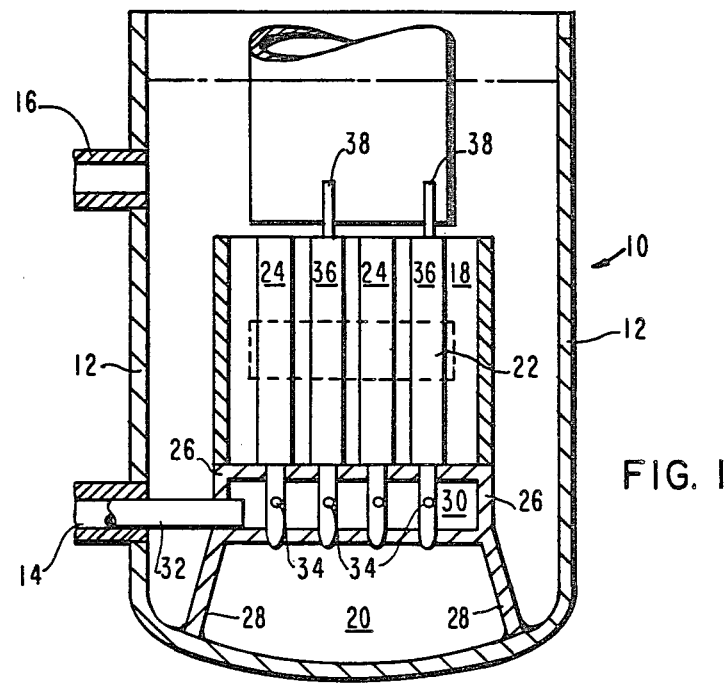
FIG. 1 is a cross-sectional view in elevation of a nuclear reactor.

Referring to FIG. 1, the nuclear reactor is referred to generally as 10 and comprises a reactor vessel 12 having an inlet 14 and an outlet 16 disposed thereon. A core 18 is disposed within reactor vessel 12 and is surrounded by reactor coolant 20 which may be a liquid metal such as liquid sodium. Core 18 has a central region 22 wherein the greatest reactivity of the core occurs. The reactor core 18 comprises a plurality of fuel assemblies 24 which may be chosen from those well known in the art. Fuel assemblies 24 are supported by lower core support 26 which may be attached to the bottom of reactor vessel 12 by means of supports 28. Lower core support 26 defines an inlet plenum 30 therewithin. A flow directing means such as conduit 32 may be attached to inlet 14 and to lower core support 26 for conducting the reactor coolant through inlet 14 and into inlet plenum 30. Fuel assemblies 24 have first openings 34 disposed in the lower section thereof and in fluid communication with inlet plenum 30 such that the flow of reactor coolant 20 through inlet plenum 30 may enter fuel assemblies 24. Once the reactor coolant has entered fuel assemblies 24, the coolant flows upwardly through fuel assemblies 24 and out through the top thereof. In this manner, heat is transferred from fuel assemblies 24 to reactor coolant 20 in a manner well understood in the art.

Still referring to FIG. 1, a plurality of control assemblies 36 are also disposed within reactor vessel 12 and within core 18. Control assemblies 36 are basically arranged similar to fuel assemblies 24 except they are also arranged to accommodate the insertion of control rods (not shown).

Figure 4:
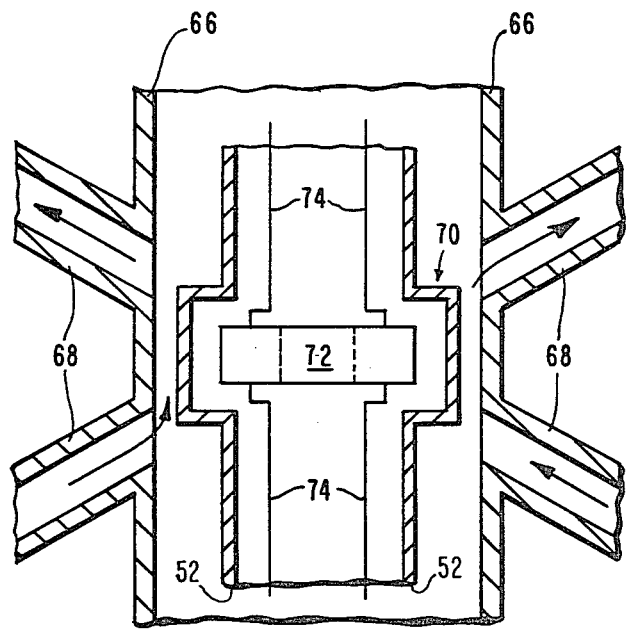
FIG. 4 is a detailed view of the thermistor arrangement.

Referring now to FIGS. 2, 3 and 4, the control rod drive mechanism is referred to generally as 38 and comprises an outer housing 40 through which is disposed a drive member 42. Drive member 42 may be a cylindrical metal member which is attached at its lower end to latching mechanism 44 and at its upper end to a drive means (not shown). Latch mechanism 44 comprises a ferromagnetic upper member 46 having a bore 48 therethrough. Bore 48 is provided to allow reactor coolant 20 to flow upwardly through control rod drive mechanism 38. A coil 50 is disposed in upper member 46 such that it is disposed around bore 48. Coil 50 is connected to electrical instrumentation and power sources located externally of reactor vessel 12 by means of hermetically sealed electrical line 52. Upper member 46 also has a first contact member 54 attached thereto which may be a conical type member disposed around a portion of upper member 46 such that it is aligned concentrically with bore 48.

Still referring to FIGS. 2, 3, and 4, a ferromagnetic lower member 56 which may be a cylindrical member is slidably disposed around upper member 46 such that it may slide vertically relative to upper member 46. Lower member 56 has a second contact member 58 attached thereto in a manner so as to be able to contact first contact member 54 when brought into contact therewith. When coil 50 is energized and first contact member 54 is in contact with second contact member 58, an electromagnetic attraction is developed therebetween which causes upper member 46 to be magnetically latched to lower member 56. A plurality of control rods 60 which are comprised of neutron absorbing material are attached to the lower end of lower member 56 and are arranged so as to be able to be inserted into control assembly 36 when lower member 56 is lowered relative to upper member 46. A cylindrical guide tube 62 is attached to the bottom of lower member 56 and disposed around control rods 60 so as to guide lower member 56 when it is lowered. A first sleeve 64 is also disposed within housing 40 and around guide tube 62 for increasing the guidance of guide tube 62 when it is lowered or raised.

Still referring to the drawings, a tubular member 66 is disposed within drive member 42. Tubular member 66 is also arranged so that line 52 may be disposed therein. A plurality of conduits 68 are attached to drive member 42 and tubular member 66 so as to provide channels through which reactor coolant 20 may flow into and out of tubular member 66. A temperature sensitive device 70 is disposed in line 52 and arranged in tubular member 66 so as to be near the junction of conduits 68. This arrangement allows the flow of reactor coolant 20 to contact temperature sensitive device 70 so that temperature sensitive device 70 may have the same temperature as reactor coolant 20.

Referring now to FIG. 4, temperature sensitive device 70 comprises a temperature responsive resistor 72 which is connected electrically by means of electric lines 74 to coil 50 and to electrical instrumentation located outside of reactor vessel 12. Temperature responsive resistor 72 is sometimes referred to as a thermistor and has the characteristic that when its temperature increases, its resistivity also increases. Temperature responsive resistor 72 may be chosen from those well known in the art such as one from Fenwal Electronics. Temperature responsive resistor 72 has the advantage of responding to the reactor coolant temperature in a much quicker manner than a Curie point material. Therefore, when the reactor coolant temperature rises above a predetermined level, the resistivity of the temperature responsive resistor 72 will increase to the point where the electrical current carried by lines 74 to coil 50 will be reduced to a level whereby magnetic latch 44 will be opened. The opening of magnetic latch 44 will cause lower member 56 to drop into the reactor core under the influence of gravity thereby shutting down the nuclear reactor. When the reactor coolant temperature returns to a lower level, the resistivity of the temperature responsive resistor 72 will also be lowered to the point where the electricity in the lines 74 will be returned to its normal level. At this point, drive member 42 may be lowered such that first contact member 54 contacts second contact member 58. When in this configuration and when coil 52 is energized, an electromagnetic attraction is developed between upper member 46 and lower member 56 thereby magnetically latching upper member 46 to lower member 56.

OPERATION

During normal operation of nuclear reactor 10, control rod drive mechanism 38 is arranged as shown in FIG. 2 such that upper member 46 is connected to lower member 56 by means of an electromagnetic attachment. Since reactor coolant 20 is continuously flowing through reactor vessel 12 and through control rod drive mechanisms 38, reactor coolant 20 flows upwardly through housing 40 and through bore 48. In addition, reactor coolant 20 flows through conduit 68 and into contact with temperature sensitive device 70. The flow of reactor coolant 20 around temperature sensitive device 70 causes the temperature of temperature sensitive device 70 to become that of the reactor coolant 20. In turn, temperature responsive resistor 72 also attains the temperature of temperature sensitive device 70 and of reactor coolant 20. Under normal operating conditions, the temperature of reactor coolant 20 and temperature responsive resistor 72 is such that the resistivity of temperature responsive resistor 72 is low. This allows sufficient electricity to pass through electrical lines 74 so as to maintain a proper magnetic flux through magnetic latch 44. However, should, for whatever reason, the temperature of reactor coolant 20 rise above a predetermined level, the temperature of temperature responsive resistor 72 would also rise to approximately this level. The increase in temperature of temperature responsive resistor 72 causes the resistivity of temperature responsive resistor 72 to increase sharply. This dramatic increase in resistivity results in a large and rapid decrease in electricity flowing through electrical lines 74 and thus through coil 50. The decrease in electricity results in a much diminished magnetic flux through magnetic latch 44. The consequent reduction in magnetic flux in magnetic latch 44 causes magnetic latch 44 to open. When this occurs, lower member 56 falls under the influence of gravity relative to upper member 46 as shown in FIG. 3. The lowering of lower member 56 causes control rods 60 to be inserted into control assemblies 36 thereby reducing the reactivity in the core 18. In this manner, the nuclear reactor is automatically and safely shut down.

When the reactor coolant temperature returns to an acceptable level, the resistivity of temperature sensitive resistor 72 will automatically return to its original level. At this point, drive line 42 may be lowered such that first contact member 54 comes into contact with second contact member 58. When in this position, the magnetic flux of coil 50 is reestablished through upper member 46 and lower member 56 such that first contact 54 and second contact 58 are joined magnetically. Next, drive line 42 may be raised which causes upper member 46 and lower member 56 to be raised to a position as shown in FIG. 2. When in this configuration, the control rod drive mechanism 38 is in its original position.

Therefore, it can be seen that the nuclear reactor shutdown system provides a mechanism for automatically, safely, and quickly shutting down a nuclear reactor in response to an overtemperature condition of the nuclear reactor coolant.

We claim:

1. Nuclear reactor shutdown apparatus comprising:
neutron absorbing control rods arranged to be inserted in a control assembly of a nuclear reactor core having a coolant flowing therethrough;
a magnetic latch comprising an upper member having a bore therethrough for flow of reactor coolant, a lower member, and a coil;
said lower member slidably disposed on the lower end of said upper member and attached to said control rods for suspending said control rods above said reactor core;
said coil disposed around said upper member and connected in an electrical circuit for establishing a magnetic flux through said upper member and said lower member for magnetically suspending said lower member above said reactor core when said coil is energized;
a tubular member connected to said bore in said upper member and disposed in the flow of reactor coolant;
a plurality of conduits located remote from said coil and connected to said tubular member for conducting a portion of said reactor coolant exiting said reactor core through said tubular member; and
a temperature responsive resistor disposed in said tubular member near said conduits in the flow of said reactor coolant and located downstream of and remote from said coil and connected to said coil by said electrical circuit whereby an increase in said reactor coolant temperature raises the temperature and resistivity of said temperature responsive resistor thereby reducing the electrical current flowing through said coil and reducing the magnetic flux through said upper member and said lower member which causes said lower member to slide downwardly relative to said upper member thereby inserting said control rods into said control assembly.

* * * * *